(12) United States Patent
Glover et al.

(10) Patent No.: US 11,030,163 B2
(45) Date of Patent: Jun. 8, 2021

(54) SYSTEM FOR TRACKING AND DISPLAYING CHANGES IN A SET OF RELATED ELECTRONIC DOCUMENTS

(71) Applicant: Workshare, Ltd., London (GB)

(72) Inventors: Robin Glover, Oxford (GB); Ben Ridgway, London (GB); Owen Oliver, London (GB); Barrie Hadfield, London (GB)

(73) Assignee: Workshare, Ltd., London (GB)

( * ) Notice: Subject to any disclaimer, the term of this patent is extended or adjusted under 35 U.S.C. 154(b) by 443 days.

(21) Appl. No.: 15/063,247

(22) Filed: Mar. 7, 2016

(65) Prior Publication Data

US 2016/0188584 A1 Jun. 30, 2016

Related U.S. Application Data

(63) Continuation-in-part of application No. 13/306,798, filed on Nov. 29, 2011, and a continuation-in-part of application No. 13/830,023, filed on Mar. 14, 2013.
(Continued)

(51) Int. Cl.
  *G06F 16/18* (2019.01)
  *G06F 3/0484* (2013.01)
  (Continued)

(52) U.S. Cl.
  CPC ........ *G06F 16/1873* (2019.01); *G06F 3/0484* (2013.01); *G06F 16/23* (2019.01); *G06F 16/2474* (2019.01); *G06F 16/285* (2019.01); *G06F 16/90344* (2019.01); *G06F 16/93* (2019.01); *G06F 40/169* (2020.01); *G06F 40/194* (2020.01); *G06F 40/197* (2020.01)

(58) Field of Classification Search
  CPC .......... G06F 17/2288; G06F 17/30368; G06F 17/2211; G06F 16/1873; G06F 16/285; G06F 16/93; G06F 16/23; G06F 16/90344; G06F 16/2474; G06F 40/194; G06F 40/169; G06F 40/197; G06F 3/0484
  See application file for complete search history.

(56) References Cited

U.S. PATENT DOCUMENTS 4,479,195 A   10/1984  Herr et al.
4,949,300 A    8/1990  Christenson et al.
(Continued)

FOREIGN PATENT DOCUMENTS

JP      10177650      6/1998
JP    2004265267      9/2004
(Continued)

OTHER PUBLICATIONS

Data Processing: Presentation Processing of Document, Operator Interface Processing, and Screen Saver Display Processing; Feb. 2011; pp. 1-33.*

(Continued)

*Primary Examiner* — Andrew R Dyer
(74) *Attorney, Agent, or Firm* — Nixon Peabody LLP

(57) ABSTRACT

This invention discloses a novel system and method for displaying a comparison of a group of related electronic documents in order that changes generated by a comparison of last versions of the group can be automatically displayed and manipulated on a single summary output screen.

45 Claims, 4 Drawing Sheets

Related U.S. Application Data

(60) Provisional application No. 62/129,957, filed on Mar. 8, 2015, provisional application No. 62/137,358, filed on Mar. 24, 2015.

(51) Int. Cl.

| | | |
|---|---|---|
| *G06F 16/23* | (2019.01) | |
| *G06F 16/93* | (2019.01) | |
| *G06F 16/28* | (2019.01) | |
| *G06F 16/2458* | (2019.01) | |
| *G06F 16/903* | (2019.01) | |
| *G06F 40/169* | (2020.01) | |
| *G06F 40/194* | (2020.01) | |
| *G06F 40/197* | (2020.01) | |

(56) References Cited

U.S. PATENT DOCUMENTS

| | | | |
|---|---|---|---|
| 5,008,853 A * | 4/1991 | Bly | G06F 16/1774 715/751 |
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mon et al. | |
| 5,293,619 A | 3/1994 | Dean | |
| 5,379,374 A | 1/1995 | Ishizaki et al. | |
| 5,446,842 A | 8/1995 | Schaeffer et al. | |
| 5,608,872 A | 3/1997 | Schwartz et al. | |
| 5,617,539 A | 4/1997 | Ludwig et al. | |
| 5,619,649 A | 4/1997 | Kovnat et al. | |
| 5,634,062 A | 5/1997 | Shimizu et al. | |
| 5,671,428 A | 9/1997 | Muranaga et al. | |
| 5,699,427 A | 12/1997 | Chow et al. | |
| RE35,861 E | 7/1998 | Queen | |
| 5,787,175 A | 7/1998 | Carter | |
| 5,787,444 A | 7/1998 | Gerken et al. | |
| 5,801,702 A | 9/1998 | Dolan et al. | |
| 5,806,078 A | 9/1998 | Hug et al. | |
| 5,819,300 A | 10/1998 | Kohno et al. | |
| 5,832,494 A | 11/1998 | Egger et al. | |
| 5,890,177 A | 3/1999 | Moody et al. | |
| 5,897,636 A * | 4/1999 | Kaeser | G06F 17/30589 |
| 5,898,836 A | 4/1999 | Freivald et al. | |
| 6,003,060 A | 12/1999 | Aznar et al. | |
| 6,012,087 A | 1/2000 | Freivald et al. | |
| 6,029,175 A | 2/2000 | Chow et al. | |
| 6,038,561 A | 3/2000 | Snyder et al. | |
| 6,049,804 A | 4/2000 | Burgess et al. | |
| 6,067,551 A | 5/2000 | Brown et al. | |
| 6,088,702 A | 7/2000 | Plantz et al. | |
| 6,128,635 A * | 10/2000 | Ikeno | G06F 17/30014 707/E17.013 |
| 6,145,084 A | 11/2000 | Zuili et al. | |
| 6,189,019 B1 | 2/2001 | Blumer et al. | |
| 6,212,534 B1 | 4/2001 | Lo et al. | |
| 6,219,818 B1 | 4/2001 | Freivald et al. | |
| 6,243,091 B1 | 6/2001 | Berstis | |
| 6,263,350 B1 | 7/2001 | Wollrath et al. | |
| 6,263,364 B1 | 7/2001 | Najork et al. | |
| 6,269,370 B1 | 7/2001 | Kirsch | |
| 6,285,999 B1 | 9/2001 | Page | |
| 6,301,368 B1 | 10/2001 | Bolle et al. | |
| 6,317,777 B1 | 11/2001 | Skarbo et al. | |
| 6,321,265 B1 | 11/2001 | Najork et al. | |
| 6,336,123 B2 | 1/2002 | Inoue et al. | |
| 6,351,755 B1 | 2/2002 | Najork et al. | |
| 6,356,937 B1 | 3/2002 | Montville et al. | |
| 6,377,984 B1 | 4/2002 | Najork et al. | |
| 6,404,446 B1 | 6/2002 | Bates et al. | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,449,624 B1 | 9/2002 | Hammack et al. | |
| 6,505,237 B2 | 1/2003 | Beyda et al. | |
| 6,513,050 B1 | 1/2003 | Williams et al. | |
| 6,547,829 B1 | 4/2003 | Meyerzon et al. | |
| 6,556,982 B1 | 4/2003 | McGaffey et al. | |
| 6,560,620 B1 * | 5/2003 | Ching | G06F 17/27 707/999.202 |
| 6,584,466 B1 | 6/2003 | Serbinis et al. | |
| 6,591,289 B1 | 7/2003 | Britton | |
| 6,594,662 B1 | 7/2003 | Sieffert et al. | |
| 6,596,030 B2 | 7/2003 | Ball et al. | |
| 6,614,789 B1 | 9/2003 | Yazdani et al. | |
| 6,658,626 B1 | 12/2003 | Aiken | |
| 6,662,212 B1 | 12/2003 | Chandhok et al. | |
| 6,738,762 B1 | 5/2004 | Chen et al. | |
| 6,745,024 B1 | 6/2004 | DeJaco et al. | |
| 6,832,202 B1 | 12/2004 | Schuyler et al. | |
| 6,918,082 B1 | 7/2005 | Gross | |
| 7,035,427 B2 | 4/2006 | Rhoads | |
| 7,085,735 B1 | 8/2006 | Hall et al. | |
| 7,107,518 B2 | 9/2006 | Ramaley et al. | |
| 7,113,615 B2 | 9/2006 | Rhoads et al. | |
| 7,152,019 B2 | 12/2006 | Tarantola et al. | |
| 7,181,492 B2 | 2/2007 | Wen et al. | |
| 7,194,761 B1 | 3/2007 | Champagne | |
| 7,212,955 B2 | 5/2007 | Kirshenbaum et al. | |
| 7,233,686 B2 | 6/2007 | Hamid | |
| 7,240,207 B2 | 7/2007 | Weare | |
| 7,299,504 B1 | 11/2007 | Tiller et al. | |
| 7,321,864 B1 | 1/2008 | Gendler | |
| 7,356,704 B2 | 4/2008 | Rinkevich et al. | |
| 7,434,164 B2 | 10/2008 | Salesin et al. | |
| 7,454,778 B2 | 11/2008 | Pearson et al. | |
| 7,496,841 B2 | 2/2009 | Hadfield et al. | |
| 7,564,997 B2 | 7/2009 | Hamid | |
| 7,570,964 B2 | 8/2009 | Maes | |
| 7,613,770 B2 | 11/2009 | Li | |
| 7,624,447 B1 | 11/2009 | Horowitz et al. | |
| 7,627,613 B1 | 12/2009 | Dulitz et al. | |
| 7,640,308 B2 | 12/2009 | Antonoff et al. | |
| 7,644,111 B2 * | 1/2010 | Jaffri | H04L 69/04 707/999.203 |
| 7,673,324 B2 | 3/2010 | Tirosh et al. | |
| 7,680,785 B2 | 3/2010 | Najork | |
| 7,685,298 B2 | 3/2010 | Day | |
| 7,694,336 B2 | 4/2010 | Rinkevich et al. | |
| 7,707,153 B1 | 4/2010 | Petito et al. | |
| 7,720,256 B2 | 5/2010 | Desprez et al. | |
| 7,730,175 B1 | 6/2010 | Roesch et al. | |
| 7,788,235 B1 | 8/2010 | Yeo | |
| 7,796,309 B2 | 9/2010 | Sadovsky et al. | |
| 7,797,724 B2 | 9/2010 | Calvin | |
| 7,818,678 B2 | 10/2010 | Massand | |
| 7,844,116 B2 | 11/2010 | Monga | |
| 7,857,201 B2 | 12/2010 | Silverbrook et al. | |
| 7,877,790 B2 | 1/2011 | Vishik et al. | |
| 7,890,752 B2 | 2/2011 | Bardsley et al. | |
| 7,895,166 B2 | 2/2011 | Foygel et al. | |
| 7,903,822 B1 | 3/2011 | Hair et al. | |
| 7,941,844 B2 | 5/2011 | Anno | |
| 7,958,101 B1 | 6/2011 | Teugels et al. | |
| 8,005,277 B2 | 8/2011 | Tulyakov et al. | |
| 8,042,112 B1 | 10/2011 | Zhu et al. | |
| 8,117,225 B1 | 2/2012 | Zilka | |
| 8,181,036 B1 | 5/2012 | Nachenberg | |
| 8,196,030 B1 | 6/2012 | Wang et al. | |
| 8,201,254 B1 | 6/2012 | Wilhelm et al. | |
| 8,209,538 B2 | 6/2012 | Craigie | |
| 8,233,723 B2 | 7/2012 | Sundaresan | |
| 8,286,085 B1 | 10/2012 | Denise | |
| 8,286,171 B2 | 10/2012 | More et al. | |
| 8,301,994 B1 | 10/2012 | Shah | |
| 8,316,237 B1 | 11/2012 | Felsher et al. | |
| 8,406,456 B2 | 3/2013 | More | |
| 8,473,847 B2 | 6/2013 | Glover | |
| 8,478,995 B2 | 7/2013 | Alculumbre | |
| 8,555,080 B2 * | 10/2013 | More | G06F 21/6218 713/186 |
| 8,572,388 B2 | 10/2013 | Boemker et al. | |
| 8,620,872 B1 | 12/2013 | Killalea | |
| 8,635,295 B2 | 1/2014 | Mulder | |

(56) References Cited

U.S. PATENT DOCUMENTS

| | | | |
|---|---|---|---|
| 8,645,824 B2* | 2/2014 | Baer | G06F 40/194 |
| | | | 715/255 |
| 8,732,127 B1 | 5/2014 | Rotterdam et al. | |
| 8,776,190 B1 | 7/2014 | Cavage et al. | |
| 8,797,603 B1 | 8/2014 | Dougherty et al. | |
| 8,839,100 B1 | 9/2014 | Donald | |
| 9,092,636 B2 | 7/2015 | More et al. | |
| 9,098,500 B1 | 8/2015 | Asokan et al. | |
| 9,311,624 B2* | 4/2016 | Diament | G06Q 10/101 |
| 9,473,512 B2* | 10/2016 | More | G06F 21/62 |
| 9,652,485 B1 | 5/2017 | Bhargava et al. | |
| 10,025,759 B2* | 7/2018 | Mulder | G06F 17/10 |
| 10,033,774 B2* | 7/2018 | Kotler | H04L 65/403 |
| 10,210,279 B2* | 2/2019 | Bhattal | G06F 16/90 |
| 2001/0018739 A1 | 8/2001 | Anderson et al. | |
| 2001/0042073 A1 | 11/2001 | Saether et al. | |
| 2002/0010682 A1 | 1/2002 | Johnson | |
| 2002/0016959 A1 | 2/2002 | Barton et al. | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson, III | |
| 2002/0087515 A1 | 7/2002 | Swannack et al. | |
| 2002/0099602 A1 | 7/2002 | Moskowitz et al. | |
| 2002/0120648 A1 | 8/2002 | Ball et al. | |
| 2002/0129062 A1 | 9/2002 | Luparello | |
| 2002/0136222 A1 | 9/2002 | Robohm | |
| 2002/0138744 A1 | 9/2002 | Schleicher et al. | |
| 2002/0159239 A1 | 10/2002 | Arnie et al. | |
| 2002/0164058 A1 | 11/2002 | Aggarwal et al. | |
| 2003/0009518 A1 | 1/2003 | Harrow et al. | |
| 2003/0009528 A1 | 1/2003 | Sharif et al. | |
| 2003/0037010 A1 | 2/2003 | Schmelzer | |
| 2003/0046572 A1 | 3/2003 | Newman et al. | |
| 2003/0051054 A1 | 3/2003 | Redlich et al. | |
| 2003/0061260 A1 | 3/2003 | Rajkumar | |
| 2003/0078880 A1 | 4/2003 | Alley et al. | |
| 2003/0084279 A1 | 5/2003 | Campagna | |
| 2003/0093755 A1 | 5/2003 | Ramakrishnan | |
| 2003/0097454 A1 | 5/2003 | Yamakawa et al. | |
| 2003/0112273 A1 | 6/2003 | Hadfield | |
| 2003/0115273 A1 | 6/2003 | Delia et al. | |
| 2003/0131005 A1 | 7/2003 | Berry | |
| 2003/0147267 A1 | 8/2003 | Huttunen | |
| 2003/0158839 A1 | 8/2003 | Faybishenko et al. | |
| 2003/0191799 A1 | 10/2003 | Araujo et al. | |
| 2003/0196087 A1 | 10/2003 | Stringer et al. | |
| 2003/0223624 A1 | 12/2003 | Hamid | |
| 2003/0233419 A1 | 12/2003 | Beringer | |
| 2003/0237047 A1 | 12/2003 | Borson | |
| 2004/0002049 A1 | 1/2004 | Beavers et al. | |
| 2004/0031052 A1 | 2/2004 | Wannamaker et al. | |
| 2004/0122659 A1 | 6/2004 | Hourihane et al. | |
| 2004/0128321 A1 | 7/2004 | Hamer | |
| 2004/0148567 A1* | 7/2004 | Jeon | G06F 17/2247 |
| | | | 715/237 |
| 2004/0186851 A1 | 9/2004 | Jhingan et al. | |
| 2004/0187076 A1 | 9/2004 | Ki | |
| 2004/0225645 A1 | 11/2004 | Rowney et al. | |
| 2004/0261016 A1 | 12/2004 | Glass et al. | |
| 2005/0021980 A1 | 1/2005 | Kanai | |
| 2005/0038893 A1 | 2/2005 | Graham | |
| 2005/0055306 A1 | 3/2005 | Miller et al. | |
| 2005/0055337 A1* | 3/2005 | Bebo | G06F 17/30528 |
| 2005/0071755 A1 | 3/2005 | Harrington et al. | |
| 2005/0108293 A1 | 5/2005 | Lipman et al. | |
| 2005/0138540 A1 | 6/2005 | Baltus et al. | |
| 2005/0204008 A1 | 9/2005 | Shinbrood | |
| 2005/0251738 A1 | 11/2005 | Hirano et al. | |
| 2005/0251748 A1 | 11/2005 | Gusmorino et al. | |
| 2005/0256893 A1* | 11/2005 | Perry | G06F 17/30589 |
| 2005/0268327 A1 | 12/2005 | Starikov | |
| 2005/0278421 A1 | 12/2005 | Simpson et al. | |
| 2006/0005247 A1 | 1/2006 | Zhang et al. | |
| 2006/0013393 A1 | 1/2006 | Ferchichi et al. | |
| 2006/0021031 A1 | 1/2006 | Leahy et al. | |
| 2006/0047765 A1 | 3/2006 | Mizoi et al. | |
| 2006/0050937 A1 | 3/2006 | Hamid | |
| 2006/0059196 A1 | 3/2006 | Sato et al. | |
| 2006/0064717 A1 | 3/2006 | Shibata et al. | |
| 2006/0067578 A1 | 3/2006 | Fuse | |
| 2006/0069740 A1 | 3/2006 | Ando | |
| 2006/0098850 A1 | 5/2006 | Hamid | |
| 2006/0112120 A1 | 5/2006 | Rohall | |
| 2006/0129627 A1 | 6/2006 | Phillips | |
| 2006/0158676 A1 | 7/2006 | Hamada | |
| 2006/0171588 A1 | 8/2006 | Chellapilla et al. | |
| 2006/0184505 A1 | 8/2006 | Kedem | |
| 2006/0190493 A1 | 8/2006 | Kawai et al. | |
| 2006/0218004 A1 | 9/2006 | Dworkin et al. | |
| 2006/0218643 A1 | 9/2006 | DeYoung | |
| 2006/0224589 A1 | 10/2006 | Rowney | |
| 2006/0236246 A1 | 10/2006 | Bono et al. | |
| 2006/0261112 A1 | 11/2006 | Todd et al. | |
| 2006/0271947 A1 | 11/2006 | Lienhart et al. | |
| 2006/0272024 A1 | 11/2006 | Huang et al. | |
| 2006/0277229 A1 | 12/2006 | Yoshida et al. | |
| 2006/0294468 A1 | 12/2006 | Sareen et al. | |
| 2006/0294469 A1 | 12/2006 | Sareen et al. | |
| 2007/0005589 A1 | 1/2007 | Gollapudi | |
| 2007/0011211 A1 | 1/2007 | Reeves et al. | |
| 2007/0025265 A1 | 2/2007 | Porras et al. | |
| 2007/0027830 A1 | 2/2007 | Simons et al. | |
| 2007/0038704 A1 | 2/2007 | Brown et al. | |
| 2007/0094510 A1 | 4/2007 | Ross et al. | |
| 2007/0100991 A1 | 5/2007 | Daniels et al. | |
| 2007/0101154 A1 | 5/2007 | Bardsley et al. | |
| 2007/0101413 A1 | 5/2007 | Vishik et al. | |
| 2007/0112930 A1 | 5/2007 | Foo et al. | |
| 2007/0150443 A1 | 6/2007 | Bergholz et al. | |
| 2007/0179967 A1 | 8/2007 | Zhang | |
| 2007/0192728 A1 | 8/2007 | Finley et al. | |
| 2007/0220061 A1 | 9/2007 | Tirosh et al. | |
| 2007/0220068 A1 | 9/2007 | Thompson et al. | |
| 2007/0253608 A1 | 11/2007 | Tulyakov et al. | |
| 2007/0261099 A1 | 11/2007 | Broussard et al. | |
| 2007/0261112 A1 | 11/2007 | Todd et al. | |
| 2007/0294318 A1 | 12/2007 | Arora et al. | |
| 2007/0294612 A1 | 12/2007 | Drucker et al. | |
| 2007/0299880 A1 | 12/2007 | Kawabe et al. | |
| 2008/0022003 A1 | 1/2008 | Alve | |
| 2008/0033913 A1 | 2/2008 | Winburn | |
| 2008/0034282 A1* | 2/2008 | Zernik | G06F 17/2211 |
| | | | 715/229 |
| 2008/0034327 A1* | 2/2008 | Cisler | G06F 9/451 |
| | | | 715/854 |
| 2008/0065668 A1 | 3/2008 | Spence et al. | |
| 2008/0080515 A1 | 4/2008 | Tombroff et al. | |
| 2008/0082529 A1 | 4/2008 | Mantena et al. | |
| 2008/0091465 A1 | 4/2008 | Fuschino et al. | |
| 2008/0091735 A1 | 4/2008 | Fukushima et al. | |
| 2008/0162527 A1 | 7/2008 | Pizano et al. | |
| 2008/0177782 A1 | 7/2008 | Poston et al. | |
| 2008/0209001 A1 | 8/2008 | Boyle et al. | |
| 2008/0219495 A1 | 9/2008 | Hulten et al. | |
| 2008/0235760 A1 | 9/2008 | Broussard et al. | |
| 2008/0263363 A1 | 10/2008 | Jueneman et al. | |
| 2008/0275694 A1* | 11/2008 | Varone | G06F 17/2785 |
| | | | 704/9 |
| 2008/0288597 A1 | 11/2008 | Christensen et al. | |
| 2008/0301193 A1 | 12/2008 | Massand | |
| 2008/0306894 A1 | 12/2008 | Rajkumar et al. | |
| 2008/0310624 A1 | 12/2008 | Celikkan | |
| 2008/0320316 A1 | 12/2008 | Waldspurger et al. | |
| 2009/0025087 A1 | 1/2009 | Peirson et al. | |
| 2009/0030997 A1 | 1/2009 | Malik | |
| 2009/0034804 A1 | 2/2009 | Cho et al. | |
| 2009/0049132 A1 | 2/2009 | Gutovski | |
| 2009/0052778 A1 | 2/2009 | Edgecomb et al. | |
| 2009/0064326 A1 | 3/2009 | Goldstein | |
| 2009/0083073 A1 | 3/2009 | Mehta et al. | |

(56) References Cited

U.S. PATENT DOCUMENTS

| | | |
|---|---|---|
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0173103 A1 | 7/2011 | Batra et al. |
| 2011/0197121 A1* | 8/2011 | Kletter ............... G06F 40/166 715/234 |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1* | 5/2012 | Mulder ............... G06F 16/93 709/206 |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun |
| 2014/0032489 A1 | 1/2014 | Hebbar et al. |
| 2014/0115436 A1 | 4/2014 | Beaver et al. |
| 2014/0136497 A1 | 5/2014 | Georgiev |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0055196 A1* | 2/2016 | Collins ............... G06F 40/197 707/690 |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 102008002960 | 4/2008 |
| KR | 1020080029602 | 4/2008 |
| WO | WO0060504 | 10/2000 |
| WO | 2001052473 A1 | 7/2001 |
| WO | 2002101577 A1 | 12/2002 |

OTHER PUBLICATIONS

Bettenburg et al., An Empirical Study on the Risks of Using Off-the-Shelf Techniques for Processing Mailing List Data, 2009, IEEE 4 pages.

Bindu et al., Spam War: Battling Ham against Spam, 2011 IEEE 6 pages.

Bobba et al. Attribute-Based Messaging: Access Control and Confidentiality, 2010, ACM 35 pages.

Chen et al., Online Detection and Prevention of Phishing Attacks, 2006, IEEE 7 pages.

Kamouskos et al., Active Electronic Mail, 2002, ACM 6 pages.

Kaushik et al., Email Feedback: A Policy based Approach to Overcoming False Positives, 2005, 10 pages.

Stolfo et al., AMT?MET: Systems for Modeling and Detecting Errant Email. 2003, IEEE 6 pages.

International Search Report of PCT Application No. PCT/US2009/064919 dated Jul. 1, 2010, pp. 1-3.

International Search Report of PCT Application No. PCT/US2010/043345, dated Apr. 28, 2011, 3 pages.

Non-Final Office Action dated Apr. 27, 2012 in Co-Pending U.S. Appl. No. 12/275,185, filed Nov. 20, 2008.

Non-final office action issued for U.S. Appl. No. 13/799,067 dated Oct. 30, 2014.

Non-Final Office Action dated Apr. 26, 2013 in Co-Pending U.S. Appl. No. 13/659,817 of More, S., filed Oct. 24, 2012.

Non-Final Office Action dated Apr. 27, 2012 in Co-Pending U.S. Appl. No. 12/275,185 of More, S., filed Nov. 20, 2008.

Non-Final Office Action dated Aug. 1, 2012 in Co-Pending U.S. Appl. No. 12/621,429, filed Nov. 18, 2009.

Non-Final Office Action dated Aug. 1, 2012 in Co-Pending U.S. Appl. No. 12/621,429 of More, S., filed Nov. 18, 2009.

Non-Final Office Action dated Aug. 13, 2013 in co-pending U.S. Appl. No. 13/306,819 by Glover, R.W., filed Nov. 29, 2011.

Non-Final Office Action dated Dec. 22, 2011 in Co-Pending U.S. Appl. No. 12/209,082.

Non-Final Office Action dated Dec. 6, 2012 in co-pending U.S. Appl. No. 13/306,798, filed Nov. 29, 2011.

Non-Final Office Action dated Jan. 9, 2012 in Co-Pending U.S. Appl. No. 12/177,043, filed Jul. 21, 2008.

(56) References Cited

OTHER PUBLICATIONS

Non-Final Office Action dated Mar. 11, 2011 in Co-Pending U.S. Appl. No. 12/209,096, filed Sep. 11, 2008.
Non-Final Office Action dated Mar. 18, 2013 in Co-Pending U.S. Appl. No. 13/659,793 by More, S., filed Oct. 24, 2012.
Non-Final Office Action dated Mar. 20, 2006 in Co-pending U.S. Appl. No. 10/136,733, filed Apr. 30, 2002.
Non-Final Office Action dated May 17, 2013 in Co-pending U.S. Appl. No. 13/306,765 by Mulder, S. P. M, filed Nov. 29, 2011.
Non-Final Office Action dated Sep. 19, 2011 for U.S. Appl. No. 12/177,043, filed Jul. 21, 2008.
Non-Final Office Action dated Sep. 19, 2012 in Co-Pending U.S. Appl. No. 12/844,818 by Glover, R., filed Jul. 27, 2010.
Notice of Allowance dated Aug. 19, 2012 in Co-Pending U.S. Appl. No. 12/177,043, filed Jul. 21, 2006.
Notice of Allowance dated Jul. 8, 2013 in Co-Pending U.S. Appl. No. 12/209,082 by S. More et al. filed Sep. 11, 2008.
Notice of Allowance dated Jun. 26, 2012 in Co-Pending U.S. Appl. No. 12/275,185 of More, S., filed Nov. 20, 2008.
Notice of Allowance dated Mar. 13, 2013 in Co-Pending U.S. Appl. No. 12/844,818 by Glover, R., filed Jul. 27, 2010.
Notice of Allowance dated Oct. 24, 2008 in Co-pending U.S. Appl. No. 10/023,010, filed Dec. 17, 2001.
Notice of Allowance dated Oct. 24, 2008 in Co-pending U.S. Appl. No. 11/023,010, filed Dec. 17, 2001.
Notice of Allowance dated Sep. 25, 2013, Co-Pending U.S. Appl. No. 13/659,817 by More, S., filed Oct. 24, 2012.
PC Magazine "Pure Intranets: Real-Time Internet Collaboration", http://www.zdnet.com/pcmag/featuresgroupware/gpwst.htm, Aug. 30, 2001, 2 pages.
Restriction Requirement Jun. 30, 2006 for U.S. Appl. No. 10/136,733, filed Apr. 30, 2002.
Restriction Requirement dated Feb. 14, 2005 for U.S. Appl. No. 10/023,010, filed Dec. 17, 2001, Issued U.S. Pat. No. 7,496,841.
Restriction Requirement dated Jun. 30, 2006 for U.S. Appl. No. 10/136,733, filed Apr. 30, 2002.
Roussev, et al., "Integrating XML and Object-based Programming for Distributed Collaboration", IEEE, 2000, pp. 254-259.
Stephen Voida et al., Share and Share Alike: Exploring the User Interface Affordances of File Sharing, Apr. 22-27, 2006, ACM, pp. 1-10.
Tsai, et al., "A document Workspace for Collaboration and Annotation based on XML Technology", Department of Electrical Engineering, 2001, pp. 165-172.
Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
U.S. Appl. No. 13/789,104, filed Mar. 7, 2013, Gofman.
V Monga, B.L. Evans Perceptual image hashing via feature points: performance evaluation and tradeoffs IEEE Transactions on Image Processing, 15 (11) (2006), pp. 3453-3466.
Weiss et al., Lightweight document matching for help-desk applications, In: Intelligent Systems and their Applications, IEEE, Vo. 15, Issue:2, pp. 57-61, ISSN 1094-7167, 2000.
Wells et al., "Groupware & Collaboration Support,", www.objs.com/survey/groupwar.htm, Aug. 30, 2001, 10 pages.
Written Oninion of PCT Application No. PCT/US2009/051313, dated Mar. 3, 2010, 4 pages.
Written Opinion PCT Application No. PCT/2009/064919, dated Jul. 1, 2010, 4 pages.
Written Opinion PCT Application No. PCT/US2009/056651, dated Apr. 21, 2010, pp. 1-5.
Written Opinion PCT Application No. PCT/US2009/056668 dated Apr. 16, 2010, pp. 1-4.
Written Opinion PCT Application No. PCT/US2009/064919 dated Jul. 1, 2010, pp. 1-4.
Written Opinion PCT Application No. PCT/US2009/065019 dated Jun. 4, 2010, p. 1-5.
Written Oninion PCT Application No. PCT/US2010/043345 dated Apr. 28, 2011, 4 pages.
Written Opinion PCT/US2009/056651 dated Apr. 21, 2010, pp. 1-5.
Advisory Action dated Apr. 12, 2013, in Co-Pending U.S. Appl. No. 12/621,429 by More, S., filed Nov. 18, 2009.
Advisory Action dated Apr. 12, 2013, in Co-Pending U.S. Appl. No. 12/621,429 of More, S., filed Nov. 18, 2009.
Advisory Action dated Nov. 1, 2013, in Co-Pending U.S. Appl. No. 13/659,793 by More, S., filed Oct 24, 2012.
Co-pending U.S. Appl. No. 10/023,010, filed Dec. 17, 2001.
Co-pending U.S. Appl. No. 10/136,733, filed Apr. 30, 2002.
Co-pending U.S. Appl. No. 12/177,043, filed Jul. 21, 2008.
Co-pending U.S. Appl. No. 12/209,082, filed Sep. 11, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/844,818, filed Jul. 27, 2010.
Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Co-pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Final Office Action dated Apr. 16, 2012 in Co-Pending U.S. Appl. No. 12/177,043, filed Jul. 21, 2008.
Final Office Action dated Apr. 17, 2007 for U.S. Appl. No. 10/023,010, filed Dec. 17, 2001, Issued U.S. Pat. No. 7,496,841.
Final Office Action dated Apr. 17, 2007 for U.S. Appl. No. 10/023,010, filed Dec. 7, 2001, Issued U.S. Pat. No. 7,496,841.
Final Office Action dated Apr. 17, 2007 in Co-Pending U.S. Appl. No. 10/023,010, filed Dec. 17, 2001, Issued U.S. Pat No. 7,496,841.
Final Office Action dated Aug. 12, 2011 for U.S. Appl. No. 12/209,096, filed Sep. 11, 2008.
Final Office Action dated Aug. 12, 2011 in Co-Pending U.S. Appl. No. 12/209,096, filed Sep. 11, 2008.
Final Office Action dated Aug. 16, 2013 in co-pending U.S. Appl. No. 13/306,798 of Glover, R.W., filed Nov. 29, 2011.
Final Office Action dated Feb. 1, 2013 in Co-Pending U.S. Appl. No. 12/621,429 by More, S., filed Nov. 18, 2009.
Final Office Action dated Feb. 1, 2013 in Co-Pending U.S. Appl. No. 12/621,429 of More, S., filed Nov. 18, 2009.
Final Office Action dated Jan. 18, 2013 in Co-Pending U.S. Appl. No. 12/844,818 by Glover, R., filed Jul. 27, 2010.
Final Office Action dated Jan. 18, 2013 in Co-Pending U.S. Appl. No. 12/844,818 of Glover, R., filed Jul. 27, 2010.
Final Office Action dated May 10, 2012 in Co-Pending U.S. Appl. No. 12/209,082, filed Sep. 11, 2008.
Final Office Action dated May 10, 2012 in Co-Pending U.S. Appl. No. 12/209,082.
Final Office Action dated Oct. 21, 2013, in Co-Pending U.S. Appl. No. 13/659,793 by More, S., filed Oct. 24, 2012.
International Search Report of PCT Application No. PCT/IB2002/005821, dated Jan. 30, 2004, 6 pages.
International Search Report of PCT Application No. PCT/2009/064919, dated Jul. 1, 2010, 3 pages.
Workshare Compare Service Administration Guide, © 2007. p. 1-25.
Workshare Compare Service Developers Guide, © 2007. p. 1-30.
Workshare Compare Service Technical Quick Start Guide, © 2007 p. 1-10.
Workshare DeltaServer Configuration Guide, © 2003 p. 1-24.
User Permissions and Permission Levels (SharePoint Foundation 2010)(technet.microsoft.com) (Jan. 4, 2011), https://technet.microsoft.com/en-us/library/cc288074(v=office.14).aspx (last visited Feb. 27, 2017), p. 1-6.
Cawood, Stephen. How to Do Everything™ Microsoft® SharePoint® 2010. McGraw-Hill, 2010, ISBN 978-0-07-174367-9 (pbk). Copyright © 2010. p. 8, 44, 45, 46, 61, 69, 82, 215.
Microsoft SharePoint 2010 White Paper , Microsoft.com, www.microsoft.com/downloads/en/details.aspx?FAMILYID=5C562F71-3AA9-46FD-ABAC-7D381813F2B8 (Sep. 2010), www.microsoft.

(56) References Cited

OTHER PUBLICATIONS com/downloads/en/details.aspx?FamilyID=5c562f71-3aa9-46fd-abac-7d381813f2b8 (last visited Feb. 27, 2017), p. 1-38.

\* cited by examiner

FIG. 3

△ ~~Quality Bonds Plc Issuer Plc~~ 1 (2 unread)

△ ACME Inc. (2 unread)

▲ ~~Lead Manager~~ Chief Executive (13 unread)

| | |
|---|---|
| Comfort Letter | The ~~Lead Manager~~ Chief Executive and the other Managers (as defined in paragraph 2 below) |
| Comfort Letter | The ~~Lead Manager~~ Chief Executive confirms that it will ensure that it receives prima facie authority from each Manager |
| Comfort Letter | The ~~Lead Manager~~ Chief Executive makes no representations as to whether such prima facie authority actually confers t |
| Comfort Letter | The ~~Lead Manager~~ Chief Executive makes no representation as to whether such prima facie authority actually confers t |
| Contract | 5.    The ~~Lead Manager~~ Chief Executive confirms that, |
| Contract | [by the Issuer and ~~Lead Manager~~ Chief Executive] |
| Contract | Based on our discussions with the ~~Lead Manager~~ Chief Executive and the Issuer, |
| | Unless the ~~Lead Manager~~ Chief Executive or the Issuer inform us otherwise, |
| | This letter is addressed to ~~Lead Manager~~ Chief Executive ("the Lead Manager") and to each of the other managers wh |
| | This letter is addressed to Lead Manager ("the ~~Lead Manager~~ Chief Executive") and to each of the other managers wh |
| Appendix 4 | In the proposed issue of (the Securities)("the Securities") and who have validly authorized the ~~Lead Manager~~ Chief Exe |
| Appendix 4 | Together with the ~~Lead Manager~~ Chief Executive |
| Appendix 4 | Is shown or into whose hands it may come (including any Manager who has not validly authorized the ~~Lead Manager~~ C |

△ ~~lead manager~~ Chief Executive (11 unread)

Uncategorized Changes (5 unread)

SYSTEM FOR TRACKING AND DISPLAYING CHANGES IN A SET OF RELATED ELECTRONIC DOCUMENTS

PRIORITY CLAIM

This application claims priority to U.S. Provisional Patent Application No. 62/129,957 filed on Mar. 8, 2015 and U.S. Provisional Patent Application No. 62/137,358 filed on Mar. 24, 2015 both of which are incorporated by reference. This application claims priority to U.S. patent application Ser. No. 15/236,392 filed on Mar. 14, 2013 which is incorporated herein as a continuation in part. This application claims priority to U.S. patent application Ser. No. 13/306,798 filed on Nov. 29, 2011, which is incorporated herein by reference as a continuation in part.

FIELD OF INVENTION

The present invention generally relates to the field of digital document review. More particularly, the present invention relates to methods and systems for displaying detected changes and/or differences between a set of original documents and a set of modified versions of the documents.

BACKGROUND

Business transactions, for example contracts, share purchases, mergers, acquisitions, etc., typically involve the creation of a group of related documents that between them define the full scope of the transaction being prepared. As the transaction progresses, the documents within the group are changed by the participants, who will often make changes to several documents before distributing the new versions. The changes in the set of documents comprising the transaction may be interrelated as well. Participants in the transaction process need to understand the changes being made to the various related documents in the transaction so that they can make informed decisions efficiently. This can be challenging and time consuming with existing tools— even in the best case where the group of documents are organized into a storage system such as a document management system (that maintains a history of previous versions), a user of a comparison tool such as WORKSHARE COMPARE™ must individually initiate comparisons of each of the documents related to the transaction, selecting the appropriate current and previous versions for comparison in each case. This manual process is time-consuming, prone to error and provides no top level overview of the changes made to the group of documents as a whole.

The invention comprises of a software program or service capable of selecting and comparing multiple documents in a single operation, with the ability to apply changes across multiple documents—for instance all documents in the group of documents related to a business transaction. The comparison procedure comprises the following steps. At least one embodiment of this invention pertains to a document management service that enables a user to initiate a comparison of the last version of all the related documents of a transition to their prior versions or some versions as of a certain date, and then request a display that summarizes all of the detected changes in a set of documents.

The invention is embodied by a computer system, software program or service that operates a software program that is capable of selecting and comparing two versions of multiple documents in a single operation—for instance all documents in the group of documents related to a business transaction. See FIG. 1. When a group comparison is initiated, a corresponding set of comparisons can be made for each document in the plurality of documents comprising the transaction, whereby a later version of each constituent document in the set is compared to an earlier version. The resulting comparisons can be then presented to the user in one screen display or in one summary document so that the user can quickly review what changes are pending in the entire set of related documents. The invention addresses the problem that as the deal closes, there may be changes to several of the set of documents that are related or interact and therefore the personnel working the transaction would prefer the convenience of seeing the changes in all of the documents together.

The document group comparison system or service may run as a standalone program operating on a user's computing device or, a program operating on a server in communication with one or more users' computing devices. In some instances, may run as a web service on a remote server where the system utilizes a browser operating on users' computers as the user interface providing control to the user and an output to display comparison results. In either scenario, the document management service receives as input a request for particular set of documents that a user wishes to see the revisions to. These and other objects, features and characteristics of the present invention will become more apparent to those skilled in the art from a study of the following detailed description in conjunction with the appended claims and drawings, all of which form a part of this specification. It should be understood that the description and specific examples are intended for purposes of illustration only and not intended to limit the scope of the present disclosure.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

FIG. 3. Schematic showing example group comparison output display.

DETAILED DESCRIPTION

Figure 1:
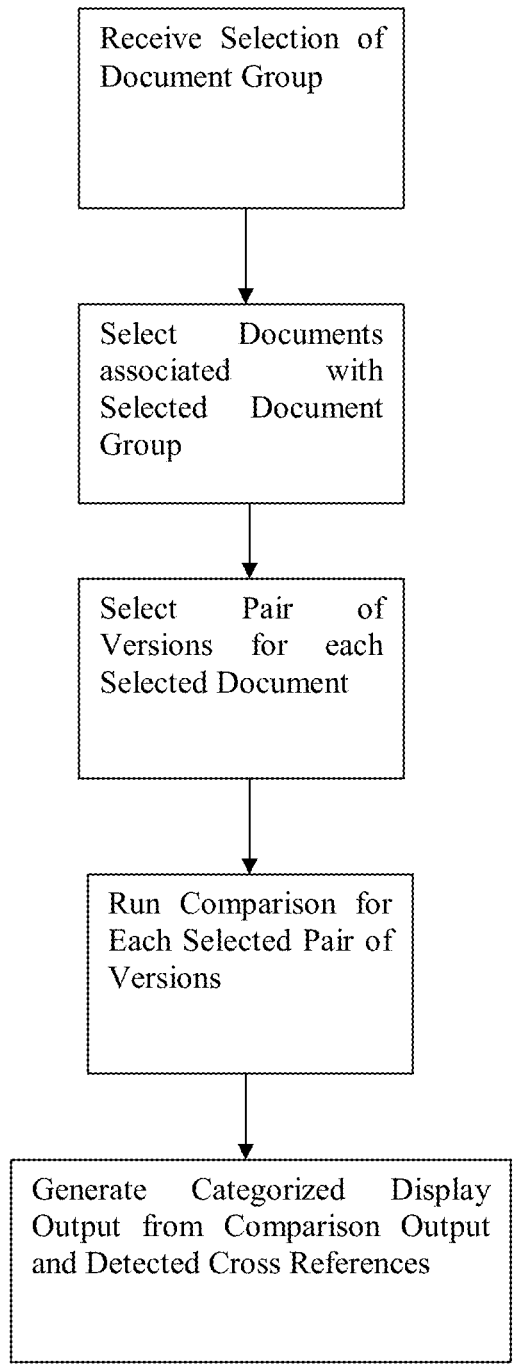
FIG. 1. Flow chart depicting the basic process steps to create the output display.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The method and system operates on one or more computers, typically using one or more servers and one or more remote user's computing devices. A customer's device can be a personal computer, mobile phone, mobile handheld device like a BLACKBERRY™ or IPHONE™ or a tablet device like the IPAD™ or GALAXY™ or any other kind of computing device a user can use to view and edit an electronic document. The user devices are operatively connected to the remote server using a data network. The invention does not require that the data network be in continuous contact with the remote file server. The invention works in conjunction with a document collaborative editing system (CES) or document management systems, (DMS) or both. For brevity, references to the DMS in the disclosure may disclose processes that may be performed by the CES or the CES in combination with the DMS. The system can be embodied in a client/server architecture, whereby an executable code operates on the user's remote device and interacts with processes operating on a server. In other embodiments, the same system can be running on the user's remote device by means of scripts or apps that are downloaded and executed within an Internet web-browser.

The user's remote computer is operatively connected to a data communication network, typically the Internet. This may be directly or indirectly through another network, for example a telephone network or a private data network. The user operates a client software on their computing device that communicates with the server that operates the process as a service, or the server that delivers documents for editing or review, that is the DMS or CES.

When the client requests to view a document available on the DMS, the request is received and processed on the DMS. In this case, the user's device may select a title for a group of documents from a graphical user interface displayed on the screen of the device. The DMS maintains all of the revisions of the set of documents document in its data storage repository. Each time the CES saves a new version, that is a new computer file. That new file typically has a different filename than the prior version. The system also keeps track of the date and time that the version was stored. The system maintains a separate database that keeps track of each user authorized to access the document on the CES and their access of the document. Once the compared set of documents is presented to the user, the user can make changes to one or more of the set of documents and save those changed documents as yet a newer version In the typical embodiment, a new version of the document is created as a distinct data file.

Document Selection

The group of documents to be compared can be selected in one of a variety of ways. In one embodiment the documents are selected by selecting multiple documents from a Document Management System (DMS). Typically, the set of documents are known to be related as a result of their status in the document management service. If the document management system is appropriately organized, the desired documents will be stored in such a way that they are easily accessible as a group—for instance they may be in the same folder or attached to a particular matter record or other identifier. For example, a plurality of documents may have metadata associated with them that is a reference to a name of a transaction. In one embodiment, a database that comprises the document management system may have a table that assigns an alphanumeric text string to a pointer or other logical reference to each document. The alphanumeric text string may be the name of a commercial transaction, for example "Whiteacre Closing Documents." The set of documents may then be the legal documents that together comprise the commercial transaction for the sale of "Whiteacre", in which case the table referring to each document will include the string "Whiteacre" in a column that references the name of the transaction that such document is a part of. Each of the plurality of documents may be represented by a series of files, each file representing a version of its corresponding document. In this case, the logical reference in the table that relates transaction names to documents would be a reference to the document table that contains pointers or other logical references to the data files embodying the versions of the corresponding document. In addition, each document would have a metadata reference to its identity, for example, its title, so that the document management system can distinguish between files that are different versions of the same document from different documents entirely. As an illustrative example, the Whiteacre transaction may be comprised of several versions of a purchase agreement to purchase Whiteacre and several versions of a deed to Whiteacre.

In addition, the system can be configured to use logical criteria to select files automatically. In one embodiment, the system can receive an alphanumeric string that is the name of a transaction. Using that string, the system can search file folder names that contain the string or sufficiently match the string. In other cases, the folder may contain sub-folders that contain relevant documents. Once the folders are identified, the system can check filenames in the folder to determine the set of documents and constituent document versions. In some cases, this requires string matching on the file names.

In another embodiment, a transaction may be associated with an email thread so that the system can select email message attachments from an email program where the system identifies the relevant emails as part of a thread that is determined to be associated with the transaction name. That thread may be identified by input from a user, or, it may be that the email system is configured to assign a transaction name to the thread, in which case a simple string match can be used to determine the relevant email thread. In this embodiment, the system can inspect each email message in the thread to detect attachments.

Figure 4:
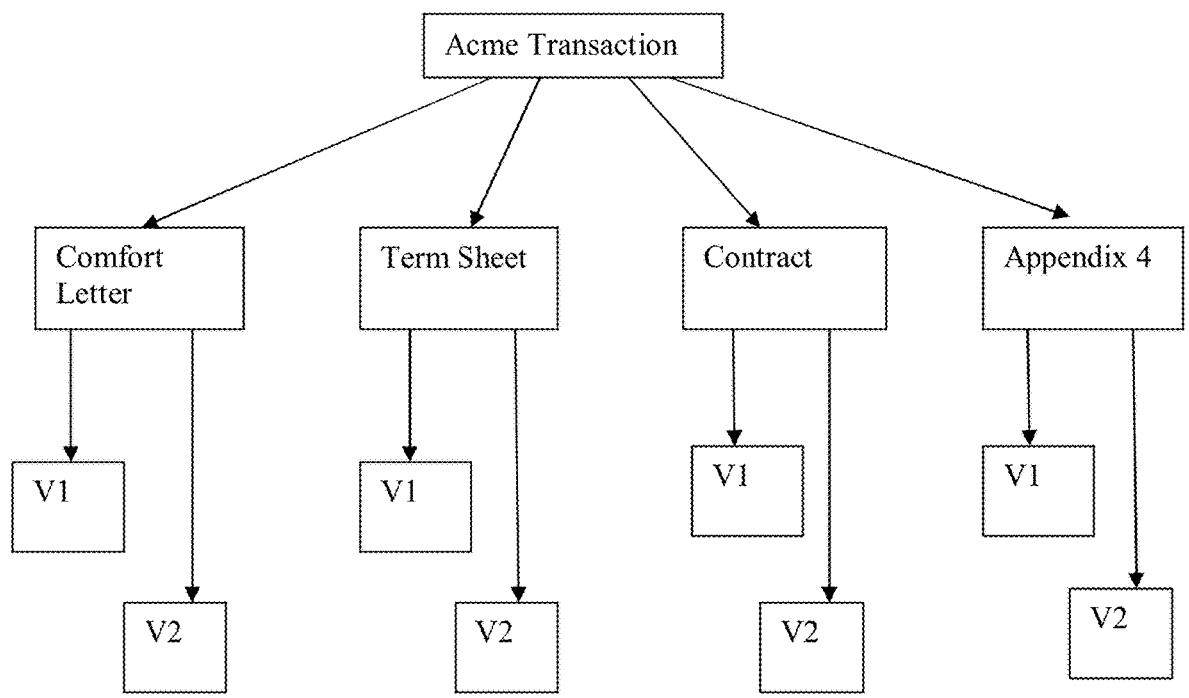
FIG. 4. Diagram showing hierarchy of documents and versions in a related group.

The invention may implement on a computer a data structure that maps references associated with a plurality of related documents stored in the system to a first group reference. Once the version selection is complete, then this data structure may be updated to include references to two version of the related documents in the group. By use of this data structure, the computer can be configured to receive a command that represents a selection of that group of related documents, and to cause the comparison process to be applied to all of the documents in the group, between the two selected versions associated with each document. The data structure may be represented as a tree, as in FIG. 4, or as a table, which can also express and encode the tree relationship of the documents in the group and their respective versions. In any case, the documents are selected, typically as multiple files from the file-system of a PC or other computer system, such files being either from local storage or accessed over a network drive connection, for example, from an online storage platform.

Version Selection

For each document in the group that is to be compared, two versions must be chosen. Where there aren't two versions, the assumption is that no changes will be displayed. In the case where data representing the revision history of the selected documents is available (i.e. data sourced from a DMS or an online storage platform that supports versioning history), selection of which versions are to be compared will be by selection of two points in time—comparing the version of each document at the later point in time against that at the earlier point in time. Sensible defaults can be chosen by the system for the two points in time, which the user can then adjust as required. For instance, a sensible default value for the later point in time would be 'Now' and for the earlier point in time would be the time that the user last reviewed the group of documents. This time value can be stored by the system in a file or other local or online storage mechanism, or determined by examining the revision history of all the documents in the group.

In the case that the files are sourced from a storage system that does not have the ability to retrieve version history, selection of the versions may require specific input from the user. While the application may provide assistance in various ways, in general the user will have to choose a previous version corresponding to each document selected. Ways in which the application embodying the invention may provide assistance in selecting appropriate versions may include:

In the case that a document has been selected as an email attachment, the application may search for other, earlier email messages that have an attachment with the same or a similar name and offer the user a list of such message attachments to choose from.

The application may search or maintain a database index of documents stored on the computer or other device upon which it runs, and offer to the user a list of documents to compare against selected from the search results or index based upon the name of the document being the same or similar and the timestamp of the document being earlier.

In the case that the document being compared is a word processing document and contains revision sequence ID information (RSID), the application may use the RSID information to infer version hierarchies between different documents found by searching or indexing and hence present more accurate suggestions to the user.

Comparison

Systems and methods for comparing various types of document (word processing, presentation document, text, etc.) are known in the art. Existing comparison applications such as WORKSHARE COMPARE™ and WORKSHARE COMPARE FOR POWERPOINT™ may be used to perform the actual comparison of each of the selected pairs of the documents in the group.

Displaying the Results

Another advantage of this invention (in addition to simplifying the selection of the appropriate group of files and their relevant versions) is the provision of a consolidated display of the changes made to the group of documents. The summary comparison document may be in one of a number of formats to give a suitable reading experience to the user. Examples of the format for the summary document may be RTF, PDF or HTML.

Such a consolidated display may include

A number of tabs, each tab corresponding to a document comparison that the user can switch between by selecting the tab on the user interface of the user's device displaying the output.

A single document view, containing all comparisons concatenated, where all of the changes of a document are presented together in the same section of the document.

A single document view, as above, but excluding pages that contain no changes in order to allow faster reading of the changes. In this embodiment the summary document would be built by inspecting in turn each page of each comparison. If the page has any changes or portions of a change on it, the page will be added to the summary comparison document, otherwise it will not be added.

Figure 2:
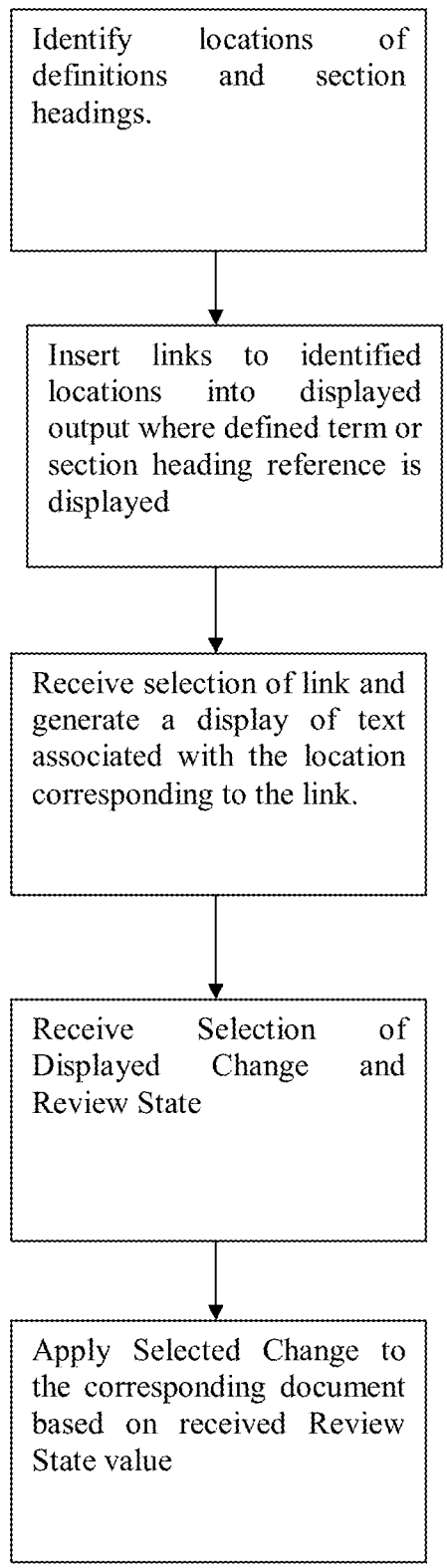
FIG. 2. Flow chart depicting the process steps for working with detected changes.

The consolidated comparison output summary is more efficient and convenient than multiple single comparisons, but in addition, it can provide information that would not be available if multiple single comparisons were performed. A categorized summary of all changes across all document pairs in addition to any of the display output techniques described above may be used (as disclosed in U.S. patent application Ser. No. 13/306,798 filed on Nov. 29, 2011, which is incorporated herein by reference.) In particular, the categorization display option can provide a summary that can group together identical changes made in different documents (for example corrections to participant names or details) and highlight locations across the multiple documents where such changes have been neglected. Analysis of the changes in any individual document would be incapable of revealing if corrections had been made in 3 out of 4 documents but not the fourth. See FIG. 2. In the preferred embodiment, the default implementation of this categorized summary would involve all changes being shown in a consolidated tree view, with changes from different documents merged together but highlighted to indicate the document of origin, for instance Accepting and Rejecting Changes A further requirement for users who wish to review changes to multiple documents is that they are likely to want to accept only some of the changes, or equivalently, reject some of the changes. This functionality can be provided by the invention in the following manner:

As part of the viewer application, a review state manager which allows the user to enter a review state for each change—such states might be 'accepted', 'rejected', 'needs discussion', etc. This module will store the review state associated with each change and display highlights in the UI in appropriate locations indicating the review state currently associated with a change.

A change apply module, capable of acting on the review state associated with each change. The apply module might work in either of 2 possible modes of operation An 'apply' mode, where it starts with the original version of each document and applies to it the changes which have been tagged with an 'accept' state. In this case, the system will create a new version of the document and update any of the DMS entries so that the new version of the document is appropriately indexed in the system.

An 'undo' mode, where it starts with the modified version of each document—in which all changes are already applied—and undoes each change which is tagged with a 'reject' state.

A particular implementation of an apply module might implement only one or both of these two modes. The invention supports the ability to apply changes across multiple documents in a single operation. For instance, the user can review a change made in one document and apply the same change across a group of documents where applicable in a single operation, without having to review and accept each instance of the change. The invention can also intelligently suggest changes to the document suite based on changes made to individual documents. For instance, a change made to a term, sentence or paragraph in one document could imply a corresponding change to other related documents that contain the same or similar term, sentence or paragraph.

Automated Cross Referencing:

The consolidated change display can also be used to present to the user cross referenced portions of the documents where the cross reference is in the changed text. Consider as an example, if the changed text in the summarized changes includes the string: "Licensee is permitted to assign its rights to an Affiliate, in accordance with Section 11." There are two cross references that a reviewing user would have to check before revising the review state on the change. First, the user may have to check the definition of "Affiliate". Second, the user may have to check what it says in "Section 11" in order to approve the change.

The invention is further comprised of a system and method that parses the changes identified by the comparison step to identify defined terms and section headings. The definition detection module finds common patterns of text used to specify definitions in documents (examples including detecting a section heading named with the string 'definitions' section, heading with a two column table, a 'definitions' section heading with a list or bullet points and defined terms in bold, or by parsing text in a structured sentence, for example: " . . . defined as . . . " or "hereinafter referred as ' . . . '" The point is that parsing rules may be constructed that identify the location within a document comprising the group, that a definition is recited. Similarly, section headings in the documents of the group can be identified by parsing the document data. Locations of section headings may easily identified by detecting formatting data that automatically organizes the heading format convention within the word processing document. In other cases, parsing on typical strings like "section", "article", "paragraph" or a number with a CR/LF may be used.

As a result of identifying locations of definitions and section headings in the group of documents, a tooltip or hyperlink function can be inserted into the output display so that it may be activated for words/phrases matching the list of detected definitions or section headings. The tooltip text or hyperlink destination being the identified location of the definition in question. In this embodiment, the definition found in the changes can appear as hyperlinks to the locations in the original document, so the user can select on the highlighted or hyperlinked text in the displayed change, and a window pops up showing the definition in the original document or the section of the original document or the section referred to by the displayed change. In yet another embodiment, is that the system is adapted so that if the hyperlinked location itself has been changed, that system presents the changed version automatically.

The output formulation may further include a definition change categorization module, capable of detecting changes within detected definition portions of the document, allowing such changes to be displayed in a definition change category in the change summary UI.

The output formulation may further include a definition inconsistency detection module, capable of checking definitions found in different source documents. If the definitions detected for a single term differ between different documents (by more than trivialities such as whitespace or punctuation) then the inconsistency is highlighted to the user in an 'inconsistent definitions' category in the change summary tree. In this embodiment, the process of locating definitions in the documents produces a table, where there are at least four columns, one for the name of the document, its version, the definition, and the definition location in the document. Once the documents in the group have been parsed to detect definitions, the system can inspect the table to see if there any redundancies, that is, two rows that contain the same defined term (ignoring trivial differences in the text) but with two different corresponding locations. If so, the system can automatically fetch the text surrounding the two different locations and run a comparison to check whether the definitions are the same or not, and to present these on the output display.

In some cases, there are defined terms commonly used in legal documents, for example, where the defined term is confined to the document that it is defined for. For example, two agreements that are part of one transaction may both use the defined term "Effective Date" or "Term". These cases may require user interaction, in which case a user can input a selection that instructs the system to ignore that definition from a consistency check standpoint. This "ignore" state can be a logical value that is an additional column in the table described above. Those definitions whose row has an "ignore" variable set will not be checked for consistency across different documents, only within the same document.

Implementation of the Invention

The invention could be implemented as

An installable piece of software to be installed and executed on a personal computer or other personal device. In this case, the software operates on a computer dedicated to the user, and the files may be accessed from a storage device in the computer or accessible or storable over a data network. The CPU of the computer executes the processes.

A web site or information portal, such as forming part of an online file collaboration platform. In this case, the software can execute on a server in such a way as to service more than one user. The files may be uploaded to the server and then stored on a local storage device while processed, or may be accessible by the server from a file repository system accessible over a data network. Completed documents that are the output of the process may be transmitted to a user's local computer for display and further editing.

Operating Environment:

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems. In some instances, especially where the mobile computing device is used to access web content through the network (e.g., when a 3G or an LTE service of the phone is used to connect to the network), the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Servers may be virtual servers, each an instance of software operating as an independent server but housed in the same computer hardware. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-browsers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A method executed by a computer system for displaying changes in a plurality of related documents, comprising:
   receiving an input representing the selection of a plurality of documents that are related in a group, where each of the plurality of documents is comprised of at least a first version file and a second version file;
   using the selection input to automatically select the plurality of documents that comprise the group;
   for each selected document among the plurality of documents that comprise the group, selecting the first version file and the second version file using a predetermined version selection rule, the plurality of documents including at least a first document and a second document, the first document having a first pair of first and second version files, the second document having a second pair of first and second version files;
   executing a plurality of document comparisons to detect changes between each pair of selected first version files and selected second version files, each comparison corresponding to each selected document in the group, the changes including (i) changes between the first and second version files of the first pair of the first document and (ii) changes between the first and second version files of the second pair of the second document;

generating and storing a display output data structure comprised of data representing the detected changes;

using the display output data structure to display on a computer screen data formatted to position together on the display, for each pair of the selected first and second version files, the detected changes corresponding to each of the plurality of documents;

automatically parsing the second version files of a group of documents to identify locations in the group of documents of at least one of definitions or section references;

inserting into the output data references to the identified locations;

automatically parsing text to determine the locations in a first or second version of a document where the text is comprised of two regions that represent two definitions where the definitional portion of the text is different; and inserting into the output data file a reference to the document indicating a definition inconsistency.

2. The method of claim 1 further comprising:
receiving a selection of a review state corresponding to at least one of the detected changes corresponding to a selected document in the group of documents; and
applying the change to the selected document in the group associated with the received review state in dependence on the value of the received review state.

3. The method of claim 1 where the generating step is further comprised of:
detecting references to text representing at least one defined terms in the text of the detected change; and
inserting a reference in the display output to the portion of the document in the group that contains the definition of the detected defined term.

4. The method of claim 3 where the inserted reference is one of: a hyperlink or an automatic text box.

5. The method of claim 4 where the inserted reference, when selected, causes the computer system to:
select text from the referred document that is associated with the reference; and
open a window in an output display where the selected text from the referred document is displayed.

6. The method of claim 1 where the generating step is further comprised of:
detecting references to text representing at least one document section headings in the text of the detected change; and
inserting a reference in the display output to the portion of the document in the group that contains the section referred to by the detected section heading.

7. The method of claim 1 further comprising:
determining if a first string comprising at least one detected change in a first version of a first document in the group meets a string match against a second string comprising the first version of a second document in the group; and
including in the generated data a data presenting the detected change associated with the first string applied to the second string in the second document.

8. The method of claim 7 where the string match is a match of the first string and second string.

9. The method of claim 7 where the string match is a match of the first string and second string while ignoring at least spaces and punctuation.

10. The system of claim 7 where the string match determines a match if a subset of the first string is found in the second string or a subset of the second string is found in the first string.

11. The method of claim 7 where the string match determines if the semantic meaning of the first string satisfies a string match to the semantic meaning of the second string.

12. The method of claim 1 further comprising:
receiving a selection of an identified location reference that is a section reference associated with a location in a document in the group;
retrieving from memory a region of text comprising the associated document file that corresponds to the location associated with the selected section reference; and
causing an output display to render the retrieved text.

13. The method of claim 1 further comprising:
receiving a selection of an identified location reference that is a definition reference associated with a location in a document in the group;
retrieving from memory a region of text comprising the associated document file that corresponds to the location associated with the selected definition reference; and
causing an output display to render the retrieved text.

14. A computer system for displaying changes in two versions of each of a plurality of documents comprising a group of related documents, comprising:
a memory storage device comprised of a data structure comprised of data that maps references associated with a plurality of related documents stored in the system to a first group reference data item, where each of the plurality of related documents are comprised of at least two document files;
a comparison module configured to:
receive a group selection command;
use the received group selection command to automatically select a plurality of documents associated with the group selection;
for each of the plurality of documents associated with the group, automatically select a first version file and a second version file of the at least two documents comprising the selected plurality of documents using a predetermined version selection rule, the plurality of documents including at least a first document and a second document, the first document having a first pair of first and second version files, the second document having a second pair of first and second version files;
execute a comparison process to detect changes between each pair of the selected first and second version files for each of the selected documents in the group, the changes including (i) changes between the first and second version files of the first pair of the first document and (ii) changes between the first and second version files of the second pair of the second document;
store data representing the detected changes;
automatically parse the second version files of a group of documents to identify locations in the group of documents of at least one of definitions or section references;
insert into the output data references to the identified locations;
automatically determine by means of parsing text the locations in a first or second version of a document where the text is comprised of two regions that represent two definitions where the definitional portion of the text is different; and insert into the output data file a reference to the document indicating a definition inconsistency; and an output module configured to:

generate and store a data structure representing displayable data output generated from the detected change data of the comparison module, the data structure being used by a computer in a combination with a display screen, organize the data structure using a received predetermined viewing rule, and display on the display screen a list of at least part of the detected changes positioned together for each pair of the selected first and second version files.

15. The system of claim 14 where the output module is further configured to generate displayable output data that is used by the computer to display the name of the document next to the displayed changes corresponding to such document.

16. The system of claim 15 where the output module is further configured to generate an output document data file comprised of a listing of the grouped detected changes.

17. The system of claim 14 where the output module is further configured to generate displayable output data that is used by the computer to display the changes in the text in combination with a selection of text from one of: before the changed text or after the changed text.

18. The system of claim 14 where the output module is further configured so that the displayable output data, when rendered on a display, presents the detected changes as at least one of tabbed page, each tabbed page corresponding to one of the plurality of documents.

19. The system of claim 18 further comprising an input module configured to receive a tab selection input that causes the display of the tabbed page associated with the received tab selection, where the displayed tabbed page is comprised of at least one of the detected changes associated with the document associated with the received tab selection.

20. The system of claim 14 where the output module is further configured to create a plurality of output data files, each corresponding to one of the documents comparisons in the group, where each output data file represents a single document comparison view containing all detected changes for that document.

21. The system of claim 20 where the output module is further configured to exclude from each output data file any comparison output pages that do not contain any detected changes.

22. The system of claim 14 further comprising:

a review state module configured to:

receive data representing a selection of one of the displayed detected changes;

receive data representing a change in the review state associated with the one of the displayed detected changes; and store the received changed review state in a data structure associated with the selected change.

23. The system of claim 22 where the review state module is further configured to modify the displayable output data and use the modified displayable output data to change the display of the selected one of the detected changes to indicate the change in review state.

24. The system of claim 22 where the review state module is further configured to:

select a detected change with an associated review state; determine that the review state represents acceptance of the change; modify the later version of the document associated with the detected change; and store as a new version of the document the modified later version of the document.

25. The system of claim 24 where the review state module is further configured to update an index in a document management system entry corresponding to the stored new version of the document.

26. The system of claim 22 where the review state module is further configured to:

select a detected change with an associated review state; determine that the review state represents rejection of the change; modify the later version of the document associated with the detected change to remove the detected change; and store as a new version of the document the modified later version of the document.

27. The system of claim 26 where the review state module is further configured to update an index in a document management system entry corresponding to the stored new version of the document.

28. The system of claim 22 where the review state module is further configured to:

determine any other detected changes in the document that are the same change as the selected change; and change the review state associated with each determined other detected changes to the received changed review state.

29. The system of claim 22 where the review state module is further configured to:

determine any other detected changes in the group of documents that are the same change as the selected change; and change the review state associated with each determined other detected changes to the received changed review state.

30. The system of claim 22 where the review state module is further configured to:

determine at least one of detected changes associated with at least one document in the group that are the same detected change as the selected detected change; and modify the review states associated with the determined at least one detected changes to the received changed review state.

31. The system of claim 14 where the comparison module is further configured to:

determine that a first string comprising at least one detected change in a first version of a first document in the group meets a string match against a second string comprising the first version of a second document in the group; and add to the displayable output data a data entry representing the application of the detected change to the first version of the second document.

32. The system of claim 31 where the string match is a match of the first string and second string.

33. The system of claim 31 where the string match is a match of the first string and second string while ignoring at least spaces and punctuation.

34. The system of claim 31 where the string match determines a match if a subset of at least a predetermined size of the first string is found in the second string or a subset of the second string is found in the first string.

35. The system of claim 31 where the string match determines if the semantic meaning of the first string matches the semantic meaning of the second string.

36. The system of claim 14 where the comparison module is further configured to:
- detect references to text representing at least one defined terms in the text of the detected change; and
- insert a reference in the display output to the portion of the document in the group that contains the definition of the at least one detected defined term.

37. The system of claim 36 where the inserted reference is one of: a hyperlink or an automatic text box.

38. The system of claim 37 where the inserted reference, when selected, causes the computer system to:
- select text from portion of the document in the group that contains the definition of the at least one detected defined term and
- open a window in an output display where the selected text from the referred document is displayed.

39. The system of claim 14 where the comparison module is further configured to:
- detect references to text representing at least one document section headings in the text of the detected change; and
- insert a reference in the display output to the portion of the document in the group that contains the section referred to by the at least one detected section heading.

40. The system of claim 39 where the inserted reference is one of: a hyperlink or an automatic text box.

41. The system of claim 40 where the inserted reference, when selected, causes the computer system to:
- select text from the portion of the document in the group that contains the section in the document that is associated with the reference and open a window in an output display where the selected text from the referred document is displayed.

42. The system of claim 14 where the comparison module is further configured to:
- receive a selection of an identified location reference that is a section reference associated with a location in a document in the group;
- retrieve from memory a region of text comprising the associated document file that corresponds to the location associated with the selected section reference; and
- cause an output display to render the retrieved text.

43. The system of claim 14 where the comparison module is further configured to:
- receive a selection of an identified location reference that is a definition reference associated with a location in a document in the group;
- retrieve from memory a region of text comprising the associated document file that corresponds to the location associated with the selected definition reference; and
- cause an output display to render the retrieved text.

44. A method executed by a computer system for displaying changes in a plurality of related documents, comprising:
- receiving an input representing the selection of a plurality of documents that are related in a group, where each of the plurality of documents is comprised of at least a first version file and a second version file;
- using the selection input to automatically select the plurality of documents that comprise the group;
- for each selected document among the plurality of documents that comprise the group, selecting the first version file and the second version file using a predetermined version selection rule, the plurality of documents including at least a first document and a second document, the first document having a first pair of first and second version files, the second document having a second pair of first and second version files;
- executing a plurality of document comparisons to detect changes between each pair of selected first version files and selected second version files, each comparison corresponding to each selected document in the group, the changes including (i) changes between the first and second version files of the first pair of the first document and (ii) changes between the first and second version files of the second pair of the second document;
- generating and storing a display output data structure comprised of data representing the detected changes;
- using the display output data structure to display on a computer screen data formatted to position together on the display, for each pair of the selected first and second version files, the detected changes corresponding to each of the plurality of documents;
- automatically parsing the second version files of a group of documents to identify locations in the group of documents of at least one of definitions or section references;
- inserting into the output data references to the identified locations;
- automatically parsing text to determine the locations in a second version of a first document and a second version of a second document where the text is comprised of two regions that represent two definitions where the definitional portion of the text is different; and
- inserting into the output data file a reference to the first and second document indicating a definition inconsistency.

45. A computer system for displaying changes in two versions of each of a plurality of documents comprising a group of related documents, comprising:
- a memory storage device comprised of a data structure comprised of data that maps references associated with a plurality of related documents stored in the system to a first group reference data item, where each of the plurality of related documents are comprised of at least two document files;
- a comparison module configured to:
  - receive a group selection command;
  - use the received group selection command to automatically select a plurality of documents associated with the group selection;
  - for each of the plurality of documents associated with the group, automatically select a first version file and a second version file of the at least two documents comprising the selected plurality of documents using a predetermined version selection rule, the plurality of documents including at least a first document and a second document, the first document having a first pair of first and second version files, the second document having a second pair of first and second version files;
  - execute a comparison process to detect changes between each pair of the selected first and second version files for each of the selected documents in the group, the changes including (i) changes between the first and second version files of the first pair of the first document and (ii) changes between the first and second version files of the second pair of the second document;

store data representing the detected changes;
automatically parse the second version files of a group of documents to identify locations in the group of documents of at least one of definitions or section references;
insert into the output data references to the identified locations;
automatically determine by means of parsing text the locations in a second version of a first document and a second version of a second document where the text is comprised of two regions that represent two definitions where the definitional portion of the text is different; and
insert into the output data file a reference to the first and second document indicating a definition inconsistency; and an output module configured to:
generate and store a data structure representing displayable data output generated from the detected change data of the comparison module, the data structure being used by a computer in a combination with a display screen,
organize the data structure using a received predetermined viewing rule, and
display on the display screen a list of at least part of the detected changes positioned together for each pair of the selected first and second version files.

* * * * *